Figure 3:
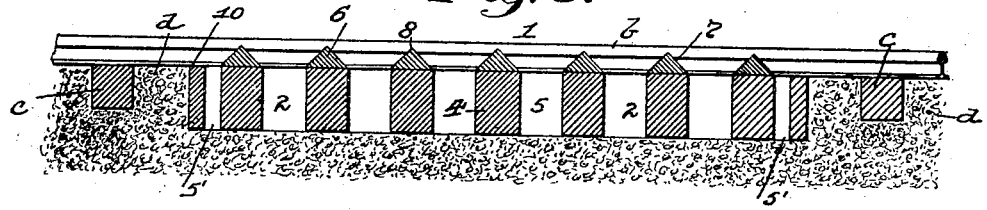

No. 813,713. PATENTED FEB. 27, 1906.
W. H. KENNEDY.
CATTLE OR STOCK GUARD.
APPLICATION FILED JUNE 7, 1905.
2 SHEETS—SHEET 1.
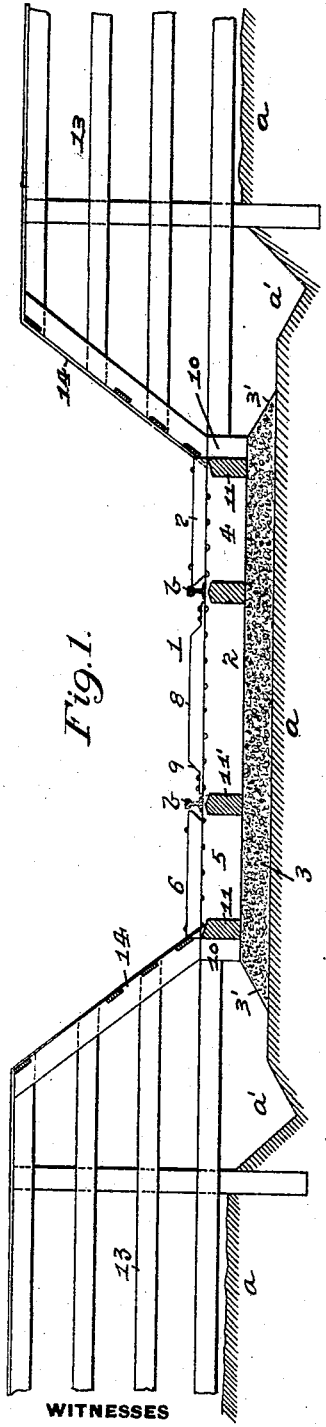
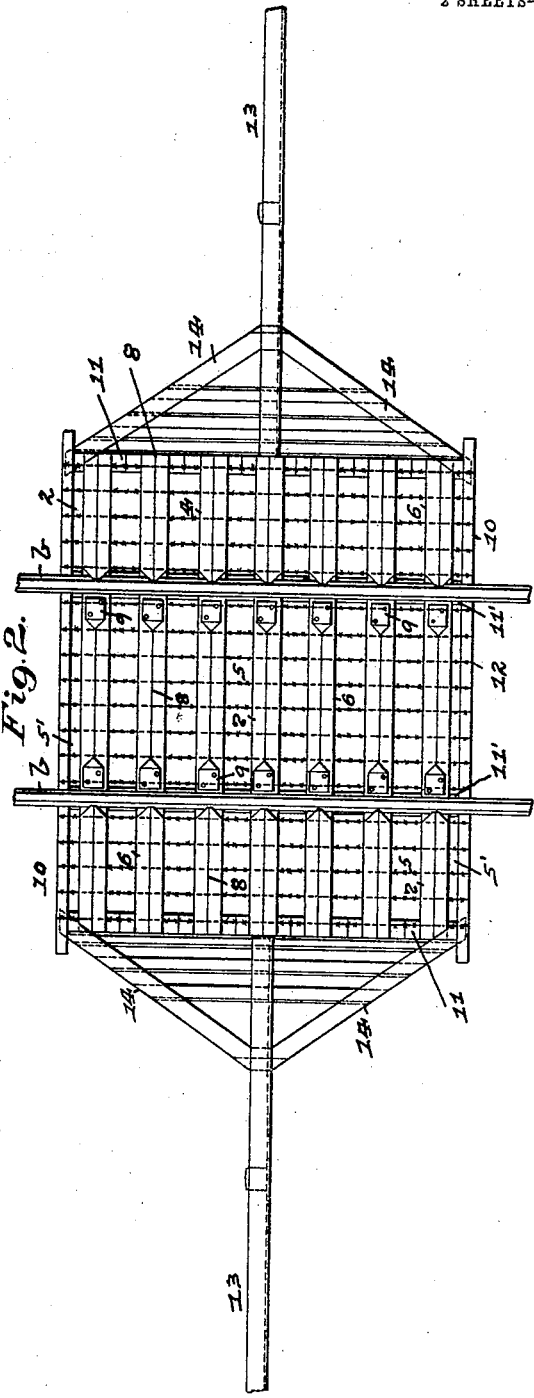
WITNESSES
INVENTOR
William H. Kennedy
By J. N. Cooke,
Attorney.

No. 813,713. PATENTED FEB. 27, 1906.
W. H. KENNEDY.
CATTLE OR STOCK GUARD.
APPLICATION FILED JUNE 7, 1905.

2 SHEETS—SHEET 2.

WITNESSES
INVENTOR
William H. Kennedy,
By J. N. Cooke,
attorney.

UNITED STATES PATENT OFFICE.

WILLIAM H. KENNEDY, OF PORTLAND, OREGON.

CATTLE OR STOCK GUARD.

No. 813,713.  Specification of Letters Patent.  Patented Feb. 27, 1906.

Application filed June 7, 1905. Serial No. 264,067.

*To all whom it may concern:*

Be it known that I, WILLIAM H. KENNEDY, a resident of Portland, in the county of Multnomah and State of Oregon, have invented a new and useful Improvement in Cattle or Stock Guards; and I do hereby declare the following to be a full, clear, and exact description thereof.

My invention relates to cattle or stock guards, and has special reference to such guards as are used on highway-crossings over railroads.

The object of my invention is to provide a cheap, simple, and efficient cattle or stock guard which will overcome the liability of stock crossing the same and will prevent the bunching of the guard-ties together by the passing of trains over the guard, as well as a guard which will permit an animal caught within the same to extricate itself easily or to turn back.

My invention consists, generally stated, in the novel construction, arrangement, and combination of parts, as hereinafter more specifically set forth and described, and particularly pointed out in the claims.

To enable others skilled in the art to which my invention appertains to construct and use my improved cattle or stock guard, I will describe the same more fully, referring to the accompanying drawings, in which—

Figure 4:
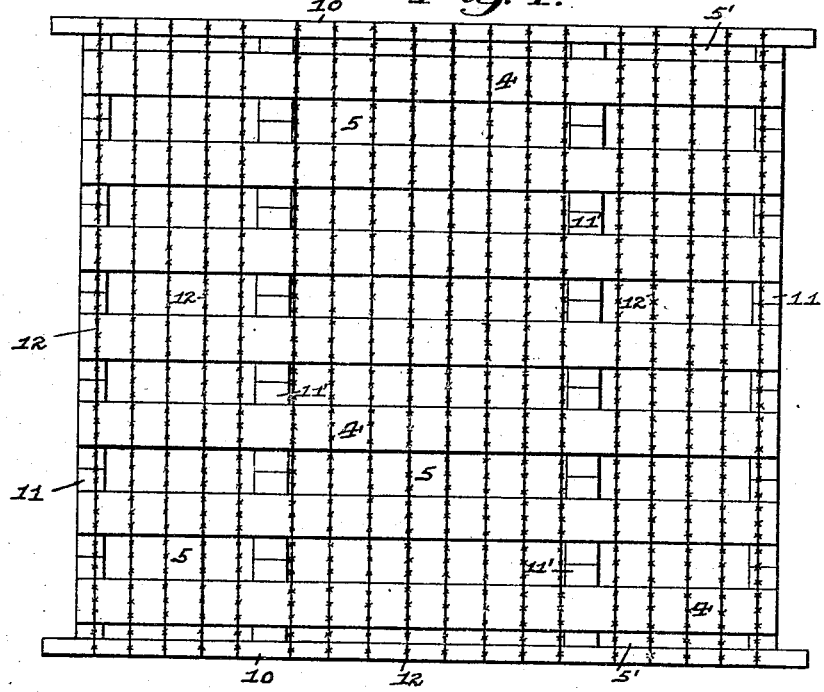
Figure 5:
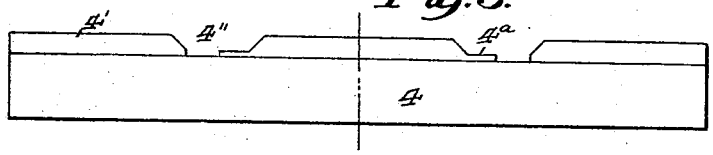
Figure 6:
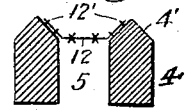
Figure 7:
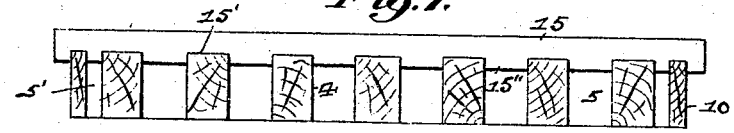

Figure 1 is an end elevation of my improved cattle or stock guard and showing some of the parts in section. Fig. 2 is a plan view of the same. Fig. 3 is an enlarged cross-section of the same. Fig. 4 is an enlarged plan view of the guard with some of the parts removed therefrom. Fig. 5 is an end elevation of another form of the guard-tie. Fig. 6 is a cross-section thereof. Fig. 7 is a cross-section of guard, showing another manner of spacing the ties.

Like symbols of reference herein indicate like parts in each of the figures of the drawings.

As illustrated in the drawings, *a* represents the ground upon which the railroad is built or constructed, and upon and above such ground is built or constructed my improved cattle or stock guard 1, which is preferably formed of wood and is placed over the main pit 2, which is formed on the surface of said ground and has a base or bottom 3. This base 3 is preferably formed of ballast and is built up from the ground *a* to the required height and has the inclined sides 3' thereon to permit the proper drainage therefrom and from the pit 2 into the ditches *a'*, which are formed in the usual manner in the ground *a* on each side of said pit.

In connection with the base 3 the pit 2 is provided with a series of guard cross-ties 4, which are supported on said base and extend across said pit to form the narrow and deep spaces 5 between them, and on the upper faces of these ties are secured the railroad-rails *b* in the usual manner. Secured by spiking to the said upper faces of the ties and on each side of and between said rails are the slats 6, which slats have their upper faces inclined at each side, as at 7, to form sharp ridges 8, and the middle or center slats between the rails *b* have the ends of these inclined faces flattened, as at 9, in order to permit the use of flangers to clear away snow, ice, &c., below the level of the top of the rails. Between the ties 4 and within the spaces 5, formed by said ties, and within the air-spaces 5', formed by the end ties and bulkheads 10 at each end of the guard 1, are the side or outer tie-spacers 11 and the inner tie-spacers 11', which are spiked to said ties and bulkheads and extend from the base 3 up and end slightly below the upper faces of the cross-ties 4, such inner spacers 11' being set at a position directly under the rails *b* and the side spacers 11 being set at the outer ends of said ties 4.

Extending from upper faces of the bulkheads 10 and over the upper faces of the guard cross-ties 4 are a series of barbed wires 12, which wires are placed on each side of the rails *b* and between the same and are held in place and secured to the bulkheads and guard cross-ties by staples.

The fencing 13 extends over the ground *a*, forming the railroad-highway, and over the ditches *a'*, formed therein, and is connected to the guard 1 by the side fence portion 14 thereon, which extends downward at an incline to said guard. On each side of the guard 1 and beyond the bulkhead 10 the rails *b* are supported in the usual manner by the ordinary railroad cross-ties *c*, and between such ties *c* and the bulkheads 10 the ordinary ballast *d* is used, as shown in Fig. 3.

When my improved cattle or stock guard 1 is in use upon the highway-crossings of a railroad, it will prevent the crossing of cattle, horses, or other stock over the same by the forming of the series of narrow and deep pits or spaces 5 within the same of sufficient depth and width to preclude the possibility of the stock crossing, such pits being formed by making the guard cross-ties 4 deeper than the ordinary railroad cross-ties $c$ and spacing them closer together.

Ordinary railroad cross-ties are usually made from six to seven inches in depth and spaced from fifteen to sixteen inches apart, while in this form a guard-tie is provided of a depth of from ten to twelve inches, which will make such a tie substantially twice as thick as such ordinary cross-tie, and they are spaced apart to about eight inches in order to allow the largest hoof of a horse or cattle to be inserted within such spaces and be withdrawn from the same.

The spaces 5 between the ties 4 of the guard 1 are left open and the spaces 11 and 11' are substituted for the ballast usually placed between the cross-ties, which will prevent such ties from bunching together by the passing of trains over the guard. These spacers can be formed of wood or metal, and, if desired, the spacers can be done away with and the ordinary bridge guard-rail 15 used on the sides of the guard 1, placed at the end of the cross-ties and secured to them by bolts or lag-screws, such as is shown in Fig. 7, in which case notches 15' are formed in the under face of the bridge guard-rail for fitting over the upper faces of the cross-ties 4 and bulkheads 10, which will allow the projections 15", formed by the said notches, to act as the spacers within the pits 5 and between the ties 4 and bulkheads 10.

The triangular-shaped slats 6 on the top of the cattle-guard cross-ties 4 are of the well-known construction and their uses generally the same in the guard 1, excepting that they are intended to increase the depth of the pits 5 between the ties 4 by extending almost to the tops of the rails $b$, so as to render it necessary for an animal in crossing the guard to raise its leg not only for a distance equal to the depth of the cross-tie 4, but in addition thereto the depth of the slat on the top of the cross-tie. It will be evident that the same objects may be obtained by doing away with these separable slats 6 and substituting therefor cross-ties with triangular tops 4', as shown in Figs. 5 and 6, in which case notches or seats 4" can be formed in said triangular top 4' for the rails $b$, while such notches or seats can also be shaped to provide spaces at each side of the rails for the passage of the flangers, as shown, 4ª in Fig. 5. The barbed wire 12, extending across the series of pits 5 on the guard, will tend to cut or lacerate the legs of an animal attempting to cross to such an extent that after extricating its legs therefrom it will not be likely to again attempt the crossing of the guard, and at the same time such wires will tend to make the guard look more formidable to the eye of the animal. In the use of the ties shown in Figs. 5 and 6 short pieces of barbed wire 12 will be strung longitudinally between adjacent ties and firmly secured to them by staples 12'.

It will thus be seen that my improved cattle or stock guard is composed of few parts easily obtained or manufactured and will not be liable to get out of shape, separated, or injured by the trains or animals crossing the same, and it being formed on the surface of the railroad-bed will not require the formation of deep pits within the road-bed to form the guard. It will also be seen that in case of any animal getting caught within the narrow and deep pits of the guard by its front feet it can easily raise such feet therefrom by swinging backward on its hind feet, which in most cases would be out of and beyond the guard.

Various modifications and changes other than those previously described may be resorted to without departing from the spirit of my invention or sacrificing any of its advantages.

What I claim as my invention, and desire to secure by Letters Patent, is—

1. A cattle or stock guard comprising a base, and a series of cross-ties extending up from said base for supporting the rails and for forming a series of pits within said guard, said pits being deeper than those formed by the ordinary cross-ties and substantially wide enough to allow the largest hoof to be inserted therein.

2. A cattle or stock guard comprising a base, and a series of cross-ties extending up from said base for supporting the rails and for forming a series of pits within said guard, said pits being deeper than those formed by the ordinary cross-ties and substantially wide enough to allow the largest hoof to be inserted therein, and means within said pits for spacing and holding said ties in position.

3. A cattle or stock guard comprising a base, a series of cross-ties extending up from said base for supporting the rails and for forming a series of pits within said guard, said pits being deeper than those formed by the ordinary cross-ties and substantially wide enough to allow the largest hoof to be inserted therein, means within said pits for spacing and holding said ties in position, and a series of barbed wires extending across the spaces between the said ties.

4. A cattle or stock guard comprising a base, a series of cross-ties extending up from said base for supporting the rails and for forming a series of pits within said guard, said pits being deeper than those formed by the ordinary cross-ties and substantially wide enough to allow the largest hoof to be inserted therein, said ties being provided with triangular upper faces thereon, means within said pits for spacing and holding said ties in position, and a series of barbed wires extending across the spaces between the ties and under the said triangular faces thereon.

In testimony whereof I, the said WILLIAM H. KENNEDY, have hereunto set my hand.

WILLIAM H. KENNEDY.

Witnesses:
M. A. LEONARD,
R. H. AXTHELM.